May 25, 1926.
J. FREDERIKSEN ET AL
FAUCET
Filed June 2, 1925
1,586,418
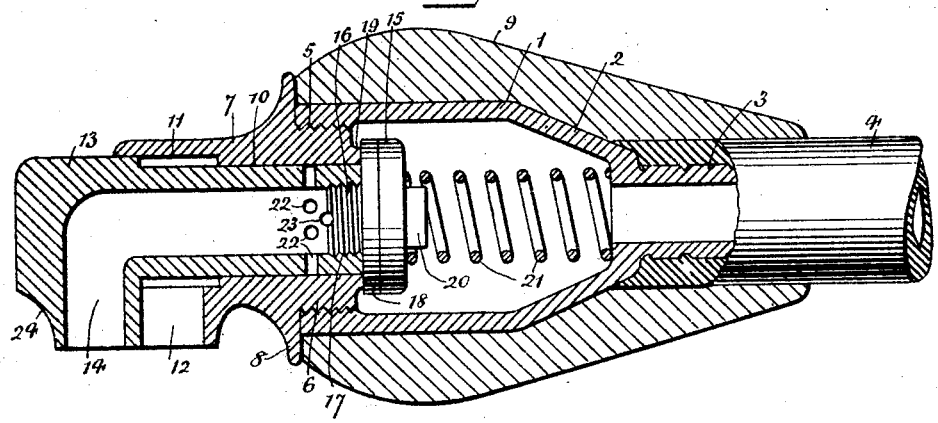
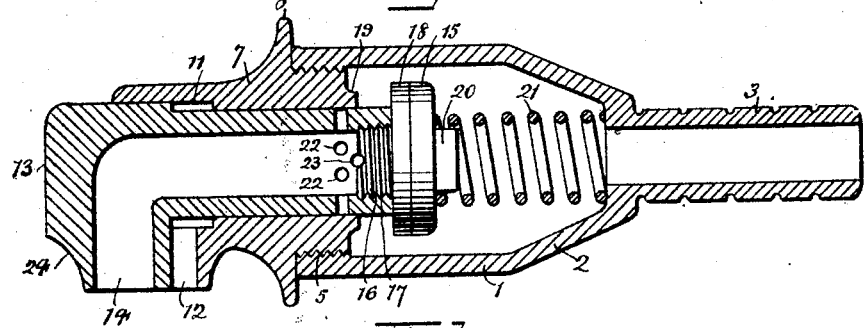
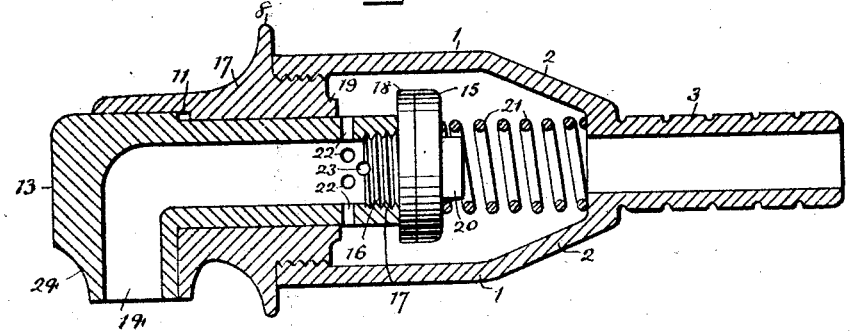
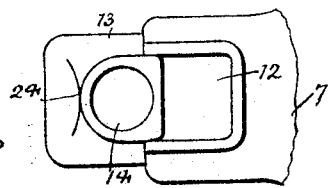
WITNESSES
INVENTOR
J. Frederiksen
C. S. Hudson
BY
ATTORNEYS Patented May 25, 1926.

1,586,418

UNITED STATES PATENT OFFICE.

JAMES FREDERIKSEN AND CHARLES SUTHERLAND HUDSON, OF BEND, OREGON.

FAUCET.

Application filed June 2, 1925. Serial No. 34,411.

This invention relates to faucets and more particularly to a faucet of the automatic closing type, requiring pressure on the nozzle or on the casing to force the nozzle into open position.

An object of the invention is to provide a faucet of this character which dispenses with the necessity for stuffing boxes or other form of packing, and which functions to admit the fluid gradually to the nozzle so as to prevent the nozzle from jumping or the fluid from squirting by the sudden escape of the same.

Our improved faucet is especially designed for use as a water faucet in the filling of automobile radiators and the like, but of course it is to be distinctly understood that our device is applicable to various other uses and for fluids of various kinds, either liquid or gaseous.

A further object is to provide a faucet which will be self-draining so as to prevent freezing in cold weather, and is especially adapted for use on either air or water hose which is adapted to be wound upon a reel, and for other uses to which ordinary types of faucet are more or less unsuited.

With these and other objects in view, the invention consists in certain novel features of construction and combinations and arrangements of parts, which will be more fully hereinafter described and pointed out in the claims.

In the accompanying drawings—

Figure 1 is a view in longitudinal section through my improved faucet, showing the nozzle in closed position;

Figure 2 is a similar view with the outer cover omitted, showing the nozzle partially open;

Figure 3 is a similar view, showing the nozzle completely open;

Figure 4 is a fragmentary bottom plan view of the nozzle and the faucet head.

1 represents the body or casing of the faucet which preferably tapers at its rear end, as shown at 2, and has a grooved nipple 3 thereon to receive a supply hose 4. The forward larger end of the casing 1 is internally screw-threaded, as shown at 5, to receive a threaded nipple 6 on a faucet head 7. This head 7 has an annular flange or enlargement 8 which bears snugly against the end of casing 1 and is of greater diameter than the casing 1 so that it forms an abutment for a rubber handle or covering 9, which encloses the casing and a portion of the hose 4 and functions to render the device less noisy and obviates damage when the device comes in contact with metal.

The head 7 has a longitudinal bore of different diameters. The smaller bore is given the reference numeral 10, and the larger bore, which is toward the outer end of the head, is given the reference numeral 11. The outer bore 11 communicates with a recess 12 in the lower portion of the head, and in these bores and recess my improved nozzle 13 is mounted.

This nozzle 13 is of general angular form in longitudinal section, and throughout the greater portion of its length is of an external diameter to fit the small bore 10 of the head 7. Throughout the outer portion of the nozzle it is externally of a diameter to fit the larger bore 11. The nozzle 13 has a laterally extending bore 14 at its outer portion which constitutes an outlet passage therethrough.

15 represents a valve which has a threaded nipple 16 thereon screwed into the threaded inner end of the bore 14 of nozzle 13, as shown at 17. The valve 15 has any suitable facing 18 to engage a seat 19 formed integrally on the inner end of head 7. This valve 15 also has an angular wrench-receiving projection 20 on its inner end to allow the valve to be screwed tightly into place on the inner end of the nozzle. A coil spring 21 is interposed between the valve 15 and the end of casing 1 and exerts pressure on the valve, tending to close the same.

The nozzle 13 is provided with a plurality of series of perforations 22 and 23, which are out of alinement and which extend through the wall of the nozzle adjacent the inner end thereof, so that when the nozzle is moved inwardly the first set of perforations 23 will allow a part of the volume of water to enter the nozzle, while a full inner pressure of the nozzle will open all of the perforations to the supply of fluid, and a maximum flow is had.

By reason of this construction, the water or other fluid is allowed to enter the bore 14 of nozzle 13 in gradually increasing volume so that there is no splashing and no sudden impact of pressure to cause the faucet to jump.

The nozzle 13 has a recessed end 24 which provides a pressure surface when the faucet is within a radiator cap or other like opening, so as to allow the nozzle to be moved longitudinally relative to the casing to cause the faucet to open after the faucet is in position. When the pressure is relieved on the nozzle, the spring 21 and the pressure of fluid back of the valve 15 will cause the latter to close against the seat 19.

Various slight changes and alterations might be made in the general form of the parts described without departing from the invention, hence we do not limit ourselves to the precise detail set forth but consider ourselves at liberty to make such slight changes and alterations as fairly fall within the spirit and scope of the appended claims.

We claim:

1. A faucet of the character described, including a casing, a head fitting the casing and having a valve seat thereon, a nozzle movable through the head, a valve fixed to the nozzle and adapted to engage the seat, a plurality of openings in the wall of the nozzle adapted to be forced into open communication with the casing in sequence whereby fluid is admitted to the nozzle in varying quantity, a spring in the casing back of the valve, an inlet nipple on the casing, an end portion of a hose received by the nipple and a handle of resilient material enclosing the casing and said portion of the hose.

2. A faucet of the character described, including a casing, a head fitting the casing and having a valve seat thereon, a nozzle movable through the head, a valve fixed to the nozzle and adapted to engage the seat, and a plurality of openings in the wall of the nozzle adapted to be forced into open communication with the casing in sequence whereby fluid is admitted to the nozzle in varying quantity, said nozzle having a laterally extending outlet end, and said head having a recess in which the outlet end of the nozzle is movable.

JAMES FREDERIKSEN.
CHARLES SUTHERLAND HUDSON.